US011461360B2

(12) United States Patent
Šmarda et al.

(10) Patent No.: US 11,461,360 B2
(45) Date of Patent: Oct. 4, 2022

(54) EFFICIENTLY INITIALIZING DISTRIBUTED CLUSTERING ON LARGE DATA SETS

(71) Applicant: Avast Software s.r.o., Prague (CZ)

(72) Inventors: Martin Šmarda, Karlovy Vary (CZ); Pavel Šrámek, Příbram II (CZ)

(73) Assignee: Avast Software s.r.o., Prague (CZ)

( * ) Notice: Subject to any disclaimer, the term of this patent is extended or adjusted under 35 U.S.C. 154(b) by 219 days.

(21) Appl. No.: 16/370,952

(22) Filed: Mar. 30, 2019

(65) Prior Publication Data

US 2019/0303387 A1    Oct. 3, 2019

Related U.S. Application Data

(60) Provisional application No. 62/651,037, filed on Mar. 30, 2018.

(51) Int. Cl.
*G06F 16/27* (2019.01)
*G06F 9/54* (2006.01)
*G06K 9/62* (2022.01)

(52) U.S. Cl.
CPC ........... *G06F 16/27* (2019.01); *G06K 9/6223* (2013.01)

(58) Field of Classification Search
CPC ........ G06F 16/27; G06F 9/542; G06K 9/6223
USPC ...................................................... 707/634
See application file for complete search history.

(56) References Cited

U.S. PATENT DOCUMENTS

| 8,923,626 | B1 * | 12/2014 | Stewenius | G06V 10/464 |
| | | | | 382/218 |
| 2005/0027678 | A1 * | 2/2005 | Aono | G06F 16/328 |
| 2014/0359626 | A1 * | 12/2014 | Guedalia | G06N 5/043 |
| | | | | 718/101 |
| 2015/0347895 | A1 * | 12/2015 | Glickfield | G06N 3/0454 |
| | | | | 706/16 |
| 2016/0127307 | A1 * | 5/2016 | Jain | G06F 11/1446 |
| | | | | 709/245 |
| 2019/0020477 | A1 * | 1/2019 | Antonatos | H04L 9/0894 |

OTHER PUBLICATIONS

Sun et al.. Regularized k-means clustering of high-dimensional data and its asymptotic consistency, Electronic Journal of Statistics, 2012, pp. 148-167, vol. 6, https://projecteuclid.org/euclid.ejs/1328280901.

Lawonn et al., What are Clusters in High Dimensions and are they Difficult to Find?, Clustering High-Dimensional Data First International Workshop, CHDD 2012, Naples, Italy, May 15, 2012, 21 pages, Revised Selected Papers, 2015, Springer.

(Continued)

*Primary Examiner* — Usmaan Saeed
*Assistant Examiner* — Earl Levi Elias
(74) *Attorney, Agent, or Firm* — Avek IP, LLC; William B. Kircher

(57) ABSTRACT

Systems and methods capable of initializing centroids in large datasets before commencement of clustering operations. The systems and methods can utilize a random sampling window to increase the speed of centroid initialization. The systems and methods can be modified to leverage parallelism and be configured for execution on multi-node compute clusters. Optionally, the initialization systems and methods can include post-initialization centroid discarding and/or re-assignment operations that adaptively control cluster sizes.

20 Claims, 10 Drawing Sheets

(56) References Cited

OTHER PUBLICATIONS

A Tutorial on Clustering Algorithms: K-Means Clustering, 3 pages, https://web.archive.org/web/20180323160023/https://home.deib.polimi.it/matteucc/Clustering/tutorial_html/kmeans.html. Accessed: Jul. 1, 2019.

Arthur et al., k-means++: The Advantages of Careful Seeding, 11 pages, http://ilpubs.stanford.edu:8090/778/1/2006-13 pdf. Accessed: Jul. 1, 2019.

Chawla et al., k-means—: A unified approach to clustering and outlier detection, 9 pages, http://www.pmg.it.usyd.edu.au/outliers.pdf. Accessed: Jul. 1, 2019.

* cited by examiner

A. Clustering initialization produces clusters of all sizes

B. Oversized and undersized clusters are identified.

C. Clustering is re-initialized in the space of an oversized cluster

D. Centroids of undersized clusters are dropped and re-assigned to split the area of oversized clusters.

EFFICIENTLY INITIALIZING DISTRIBUTED CLUSTERING ON LARGE DATA SETS

CROSS-REFERENCE TO RELATED APPLICATIONS

This application claims priority to U.S. Provisional Patent Application Ser. No. 62/651,037, filed on Mar. 30, 2018, entitled "EFFICIENTLY INITIALIZING DISTRIBUTED CLUSTERING ON LARGE DATA SETS," currently pending, the entire disclosure of which is incorporated herein by reference.

FIELD

The disclosure relates generally to data clustering on computing systems, and more particularly, to efficiently initializing distributed clustering on large data sets.

BACKGROUND

Cluster analysis (clustering) is a well-documented machine learning (ML) problem. One of the simplest and most popular clustering algorithms is called "k-means" clustering. In short, the algorithm uses an a priori chosen number of centroids ("k") to cluster data points. Every sample in the data set is a member of a cluster represented by the centroid closest to the sample as measured by some distance metric (e.g., the "L2" metric, generalized Pythagorean theorem). The algorithm iteratively moves centroid positions to find a state where the total sum of distances is minimal.

One of the major weaknesses of k-means clustering is the quality of clustering results being heavily dependent on the initial position of the centroids. One drawback of k-means clustering is that it requires the number of clusters k as an input parameter. The quality of k-means clustering increases as the value of the k parameter approaches the number of natural clusters in the dataset, but the optimal value of k is unknown before execution of the algorithm. A second drawback is that the quality of k-means clustering increases as the initial centroid positions approach the locations of the natural centroids of the clusters, but these locations are unknown before execution of the algorithm. The k-means++ clustering algorithm addresses this second drawback. The k-means++ algorithm attempts to initialize centroid starting positions by probabilistically leveraging points already present in the dataset instead of attempting to evenly partition the entire space or use purely random datapoints.

However, the computational power required to perform naïve k-means++ initialization on the scale of very large datasets (e.g., hundreds of millions of samples, hundreds of features each) is prohibitively large to the point of such an approach being infeasible.

Additionally, in some cases, ML systems that perform further processing on the clustered data can typically only reasonably handle clusters below a certain size. Larger clusters pose a significant hurdle due to the nonlinear scaling of the computational difficulty of ML modelling. Also, clusters that are only hundreds of samples or less in size pose a problem too, because there is not enough data in them to reliably train a ML model. Both the unfeasibly large and the unfeasibly small clusters may be natively present in a dataset and routinely manifest themselves. Conventional techniques, such as k-means++, are unable to prevent clusters of unacceptable size from forming upon initialization.

SUMMARY

In an aspect, the inventive subject matter provides a large-dataset-capable centroid initialization method that utilizes a random sampling window to increase speed of centroid initialization. In some embodiments, the initialization method is modified to leverage parallelism, configured to execution on multi-node compute clusters. Optionally, the initialization method can include a post-initialization centroid discarding and/or re-assignment that adaptively controls cluster sizes.

Systems and methods enable efficiently initializing centroids for clustering operations by (i) obtaining a set of datapoints, wherein the set of datapoints includes a plurality of datapoints; (ii) performing one or more integrity checks on the set of datapoints; (iii) spawning a plurality of threads; (iv) creating, in parallel by the plurality of threads, a random view of the set of datapoints; (v) determining, in parallel by each thread of the plurality of threads, a window of the random view of the set of datapoints for the thread, wherein each window comprises a distinct sub-space of the set of datapoints; and (vi) producing, in parallel by each thread of the plurality of threads, one centroid for the datapoints within the window of the thread by performing one iteration of a clustering algorithm, wherein each produced centroid is stored in a memory storage local to each thread.

BRIEF DESCRIPTION OF THE DRAWINGS

For a better understanding of the inventive subject matter, reference may be made to the accompanying drawings in which.

DETAILED DESCRIPTION

In the following detailed description of example embodiments, reference is made to the accompanying drawings that form a part hereof, and in which is shown by way of illustration specific example embodiments in which the inventive subject matter may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The description of the various embodiments is to be construed as describing examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Figure 1:
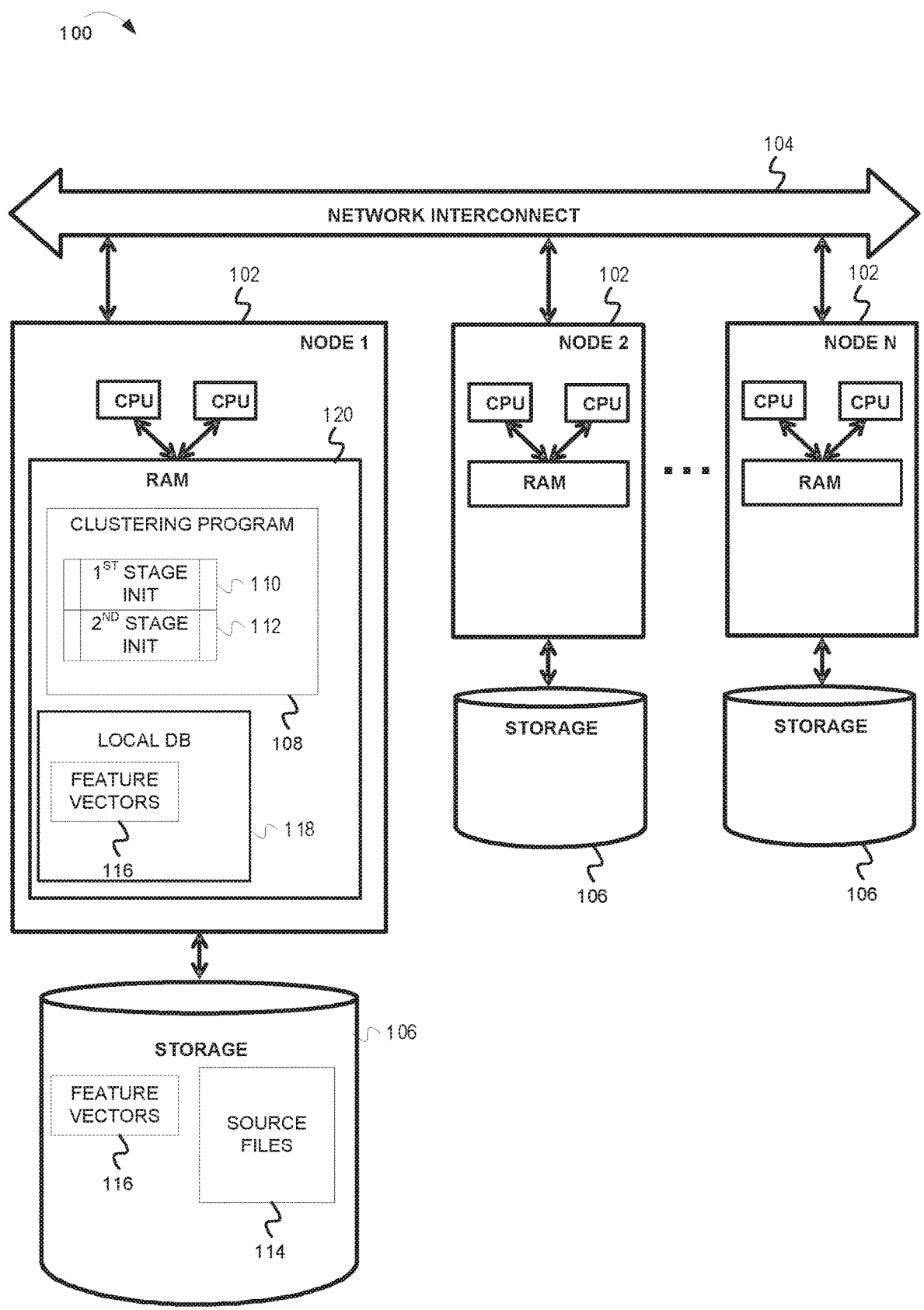
FIG. 1 is a block diagram illustrating components of a compute cluster for performing data clustering.

FIG. 1 is a block diagram illustrating components of a compute cluster 100 for performing data clustering in accordance with the methods and techniques described herein. Compute cluster 100 comprises a plurality of computing nodes 102 that each has its own data storage 106 (e.g., one or more hard drives or other persistent storage) and multiple processor cores that share access to a main memory 120 (e.g., random-access memory (RAM)). The nodes 102 are communicatively coupled and can communicate via a high-speed network interconnect 104.

The computing nodes 102 are each capable of executing data clustering algorithms utilizing the initialization methods and techniques described herein. The computing nodes 102 may be comprised of one or more computing devices including, but not limited to, one or more server computers, one or more supercomputers, personal computers (PCs), desktop computers, laptop computers, tablet computing devices, smartphones, and the like, and/or combinations thereof.

The network interconnect 104 is capable of facilitating the exchange of data (e.g., network packets, data messages, etc.) among the computing nodes 102. The network interconnect 104 can include a local area network (LAN) that is connectable to other telecommunications networks, including other LANs or portions of the Internet or an intranet. The network interconnect 104 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, network interconnect 104 is any medium that allows data to be physically transferred through serial or parallel communication channels (e.g., copper wire, optical fiber, computer bus, wireless communication channel, etc.).

Each data storage 106 can store a set of source files 114 (i.e., a dataset). In some embodiments, the source files can be executable files such as Windows executable files (e.g., PE files). Those skilled in the art will understand that the inventive subject matter is not limited to operating on source files and can operate on any dataset, particularly large (e.g., ten million or more datapoints in some embodiments), high-dimensional (e.g., one hundred or more dimensions in some embodiments) datasets. As those skilled in the art will understand, memory consumption is a product of the number of samples, the number of dimensions, and precision. When these properties of a dataset increase (e.g., such that the dataset is large and/or high-dimensional), the dataset may extend beyond the memory limits of a single computing device such that processing of the dataset is distributed among a plurality of nodes while keeping the properties of regular k-means++. Feature vectors 116 can be produced from the source files 114 using a feature extraction program (not shown). The feature extraction program receives a source file 114 as input, and produces a feature vector 116 as an output. The feature vectors 116 can be stored in a local database 118 that is stored in the main memory 120 (e.g., RAM) of a node 102. There can be hundreds of millions of feature vectors 116 stored in the local database 118. An individual feature vector can be a tuple having several hundred numerical values, where a numerical value of the feature vector represents a feature of a source file 114. Optionally, the feature vectors 116 can be stored in data storage 106.

Clustering program 108 operates on the feature vectors 116. In some embodiments, there are two stages 110 and 112 (also referred to as layers) of initialization, where each stage may be executed in parallel across the multiple computing nodes 102 of a compute cluster 100.

The first initialization stage 110 is local to each node 102, where multiple threads can perform a computational task in parallel on one machine with multiple processor cores that can all access the entirety of the main memory 120 of that node 102. In some embodiments, the first initialization stage 110 operates on data (e.g., feature vectors 116) local to that particular node 102. The second initialization stage 112 is cluster-wide, where multiple computing nodes 102 of the compute cluster 100 communicate with each other via the network interconnect 104 and reach a result by means of sending data messages, without accessing each other's main memory 120. This approach can be desirable because it leverages multi-core machines for problems of scale that can be beyond the scope of one such machine, allowing for scaling in both processing power and total memory by adding more computing nodes 102 to the compute cluster 100.

After performing the novel controlled centroid initialization described herein, the clustering itself can be realized by means of a conventional k-means clustering algorithm. In some embodiments, the clustering program 108 can be provided with the k parameter (number of expected clusters) ahead of time. In alternative embodiments, k may be provided as a recommendation to the initialization techniques described herein, after which k is determined and fixed. Once clustering finishes, results can be sent to downstream components of a system that uses clustered data as input.

Figure 2:
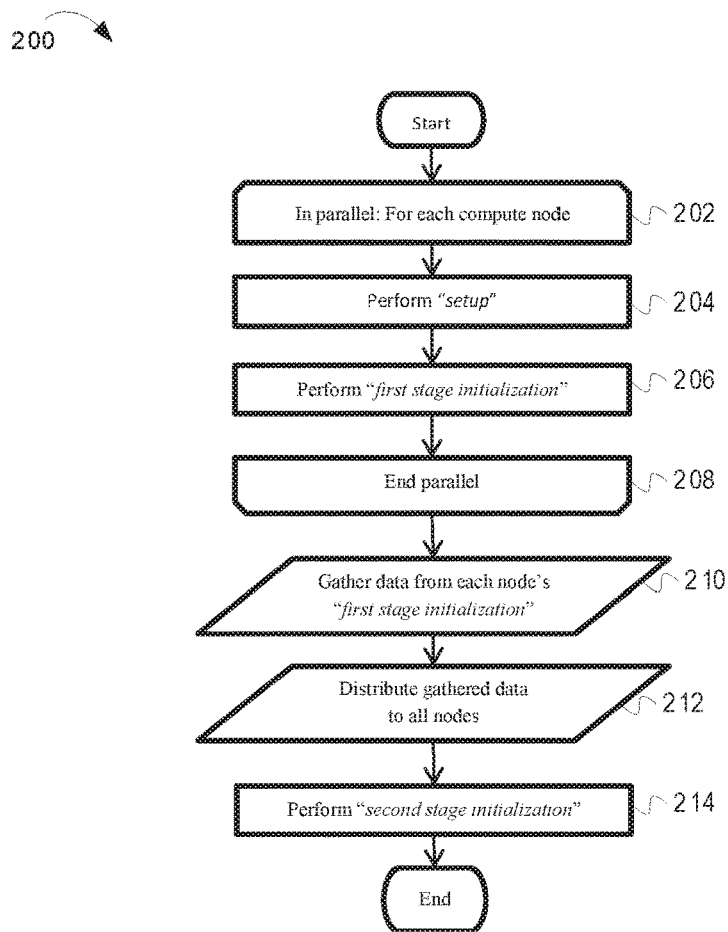
FIG. 2 is a flow chart illustrating a method for multi-node parallel k-means++ initialization.

FIG. 2 is a flow chart illustrating a method 200 for multi-node parallel k-means++ initialization according to embodiments. In an embodiment, the clustering program 108 performs the initialization method 200. Before the initialization method 200 is described in detail, two mathematical operations will be defined:

Execution of a roundUp(a) operation produces an integer c which is the smallest integer greater than or equal to a; and Execution of a roundUpToMultipleOf(a, b) operation produces an integer c which is the smallest integer c>=a which is also an integer multiple of b.

Block 202 defines the start of operations that can be performed in parallel. For each computing node 102 that will take part in the initialization method 200, the operations of blocks 204 and 206 can be performed on the computing nodes 102.

At block 204, a setup operation is performed on the computing nodes 102 that are participating in the initialization method 200. To run the multi-staged algorithm on multiple computing nodes 102 in parallel, it is desirable to compute some initial settings prior to the first stage and second stage initializations.

It can be convenient to split a workload equally to all computing nodes 102 and further to all executional threads in some cases. Therefore, multiples of certain numbers are considered properly-sized blocks of work.

In some embodiments, the setup initialization algorithm takes the following parameters:

nodeCnt, the number (e.g., integer) of computing nodes 102 on which the multi-staged algorithm is being executed. In an embodiment, nodeCnt is determined automatically from the properties of the distributed system on which the algorithm is executed.

k, the desired number (e.g., integer) of centroids. In some embodiments, the k parameter is received from a graphical user interface input. In alternative embodiments, the k parameter is loaded from a configuration stored in a memory storage device. Optimal values of the k parameter that balance the approximation of natural cluster count with processing time (e.g., as clustering slows down with increased k), may be determined experimentally by monitoring the clustering performance in some aspects.

overheadFactor, a multiplier value of how many centroids are to be created as the first stage initialization output (e.g., a real number greater than or equal to 1). In some embodiments, the overheadFactor parameter is received from a graphical user interface input. In alternative embodiments, the overheadFactor parameter is loaded from a configuration stored in a memory storage device. In some aspects, the overheadFactor parameter may be determined by monitoring the algorithm performance. The overheadFactor parameter is a tuning parameter (e.g., a higher overheadFactor parameter value increases clustering quality but decreases speed, and a lower overheadFactor parameter value decreases clustering quality but increases speed).

candidateFactor, a multiplier value of how many candidates are to be considered as input (e.g., a real number greater than or equal to 1). In an embodiment, the candidateFactor parameter is received from a graphical user interface input. In alternative embodiments, the candidateFactor parameter is loaded from a configuration stored in a memory storage device. In some aspects, the candidateFactor parameter may be determined by monitoring the algorithm performance. The candidateFactor parameter is a tuning parameter (e.g., a higher candidateFactor parameter value increases clustering quality but decreases speed, and a lower candidateFactor parameter value decreases clustering quality but increases speed). As further described herein, the candidateFactor parameter is a multiplier applied to both the first and second stages that controls how many candidates are selected as input for the stage based on that stage's target centroid count.

In some embodiments, settings for the first stage initialization can be calculated as follows:

$$firstStageCentroidCnt = \frac{roundUpToMultipleOf(k \times overheadFactor, nodeCnt)}{nodeCnt}$$

$$firstStageCandidateCnt = roundUp(firstStageCentroidCnt \times candidateFactor)$$

In some embodiments, settings for the second stage initialization can be calculated as follows:

secondStageInputCnt=firstStageCentroidCnt×nodeCnt
secondStageCentroidCnt=k
secondStageCandidateCnt=roundUpToMultipleOf(k× candidateFactor,nodeCnt)

At block 206, a first stage initialization is performed locally on the computing nodes 102 that are participating in the initialization method 200. The computing nodes 102 executing the first stage initialization can each take two arguments, "number of candidates" and "number of centroids to produce" (k), and operate on a dataset (e.g., feature vectors 116, etc.) to generate a predetermined number of centroids within the dataset. Details on the first stage initialization are provided below with reference to FIG. 3. In an embodiment, the first stage initialization of block 206 comprises the first initialization stage 110.

Block 208 marks the end of the operations that are performed in parallel on the computing nodes 102. The initialization method 200 can wait at block 208 for the computing nodes 102 that are participating in the initialization method 200 to finish the operations of blocks 204 and 206.

At block 210, data generated during the first stage initialization performed at block 206 (e.g., the generated centroids) is gathered from each computing node 102.

At block 212, the data (e.g., centroids) gathered at block 210 can be distributed to all of the computing nodes 102 that are participating in the initialization method 200.

At block 214, the computing nodes 102 that are participating in the initialization method 200 each perform a second stage initialization. The computing nodes 102 executing the second stage initialization can also take two arguments "number of candidates" and "number of centroids to produce" (k), and operate on the data distributed at block 212 to generate a predetermined number of centroids within the dataset. The second stage initialization can be performed in parallel across all of the nodes participating in the process. Details on the second stage initialization are provided below with reference to FIG. 7. In an embodiment, the second stage initialization of block 214 comprises the second initialization stage 112.

After completion of block 214, the initialization method 200 results initialized centroids that can be used in conventional clustering algorithms, such as the k-means clustering algorithm for example. In an embodiment, a discarding stage as further described herein may optionally be performed by the compute cluster 100 before performance of the clustering algorithm. After the clustering is finished, the resulting cluster data (i.e., the final centroid feature vectors and cluster membership indices for the entire dataset) are passed to downstream systems. An example downstream system includes, but is not limited to, systems that gather the clusters and use them to train ML classifiers. The resulting super-classifier may deployed in practical applications, such as those in which it helps identify the presence of malicious software in a file, for example.

Figure 3:
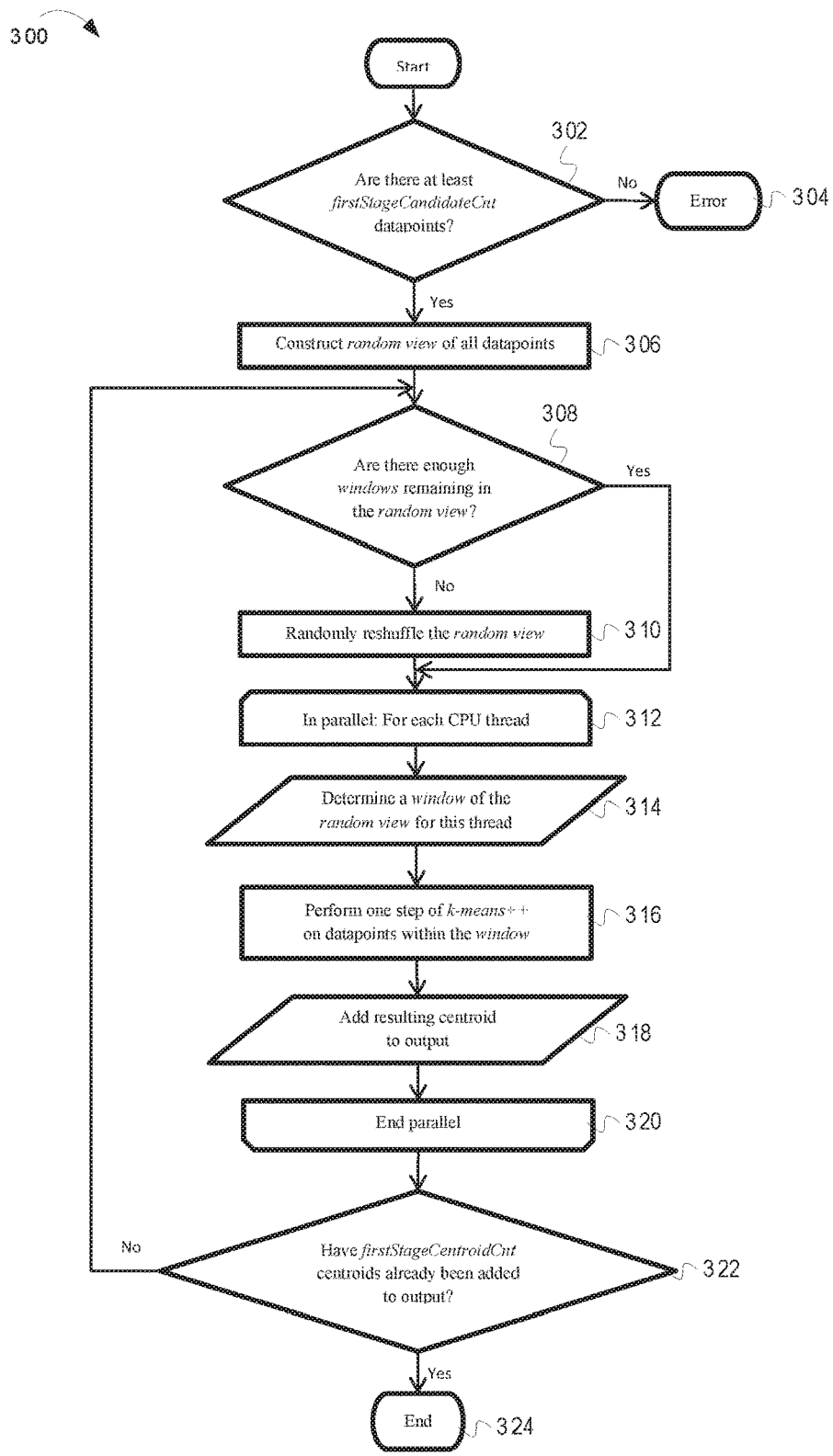
FIG. 3 is a flow chart illustrating further details of a first stage of the multi-node parallel k-means++ initialization.

FIG. 3 is a flow chart illustrating further details of a first stage initialization method 300 of the multi-node parallel k-means++ initialization. The first stage initialization method 300 algorithm can be performed independently by each computing node 102 in the compute cluster 100. The computing nodes 102 can perform the same algorithm on their data and they do not need to communicate with each other during operation of the first stage initialization method 300. The first stage initialization method 300 operates on a set of datapoints (e.g., a dataset of feature vectors 116, etc.). The first stage initialization method 300 is described herein as executing on a single computing node 102, however one skilled in the art will understand that the first stage initialization method 300 may be executed by each of a plurality of computing nodes 102 substantially in parallel as further described herein. In an embodiment, the first stage initialization method 300 comprises block 206 of the initialization method 200.

At block 302 integrity checks can be made on the dataset. In particular, the computing nodes 102 executing the first stage initialization method 300 can check to determine if there are at least firstStageCandidateCnt datapoints available on each computing node 102. When the criteria are not met (i.e., when the dataset fails the integrity check(s)), then the first stage initialization method 300 proceeds to block 304 where an error can be generated and the first stage initialization method 300 ends. Otherwise (i.e., when the dataset passes the integrity check(s)), local parallel computing starts on the computing node 102. A plurality of threads can be spawned by the computing node 102 when the dataset passes the integrity check(s). In some embodiments, it is desirable for performance purposes to create one thread per processor core on each physical computing node 102. However, those skilled in the art will understand that other multithreading implementations, such as thread-level parallelism, instruction-level parallelism, and the like can be utilized.

At block 306, a random view of the datapoints is constructed. The random view of all the datapoints can be created in parallel by local threads on the node (i.e., on each node, the threads work in parallel to create one random view to be used by that node). Such a view represents the datapoints as if they were randomly shuffled in the local in-RAM database 118 without actually moving them around. This allows the resulting centroid selection in later steps to be uniformly random. In some embodiments, the random view is comprised of a list of indices (e.g., numbers determining positions) of samples in local database 118. Shuffling a list of indices, which are several orders of magnitude smaller than feature vectors, is faster and utilizes less resources than shuffling the datapoints.

Figure 4:
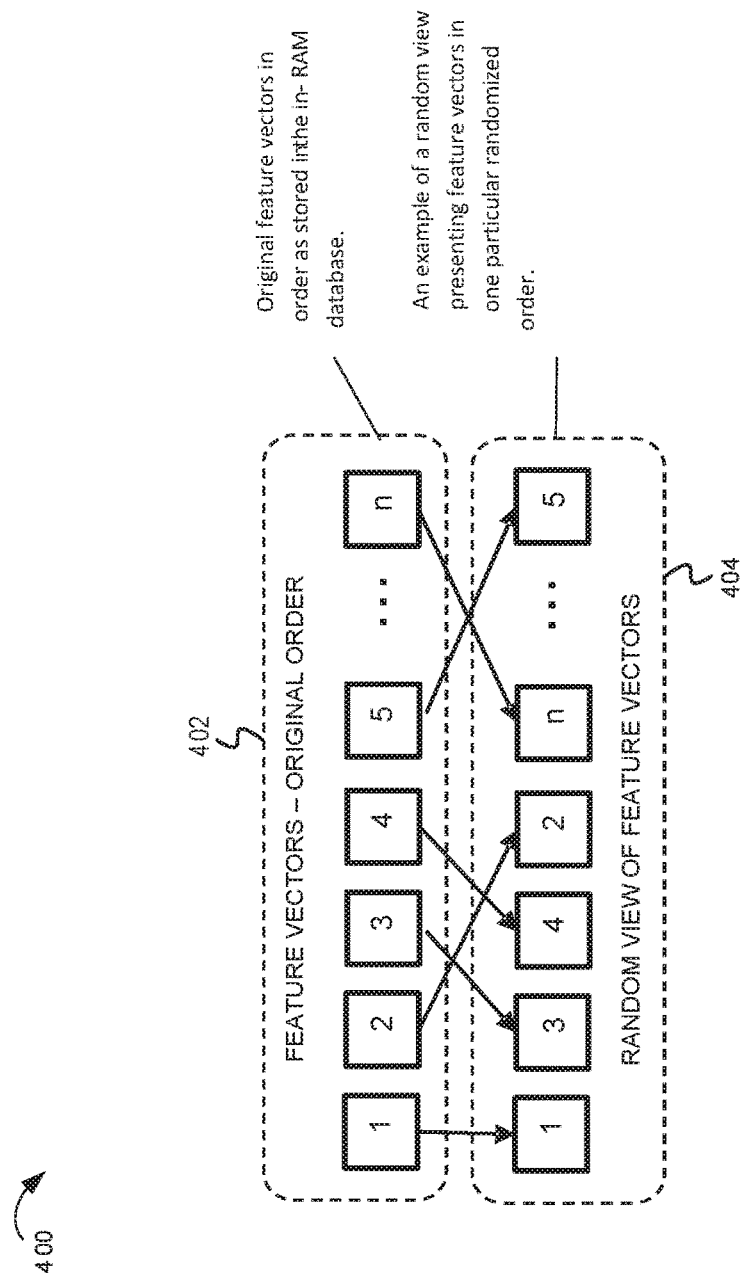
FIG. 4 is a diagram illustrating construction of a random view of feature vectors.

FIG. 4 illustrates the creation of a random view. Prior to creation of the random view, the feature vectors are stored in the local in-RAM database 118 in the order illustrated in 402. Random view 404 represents an example random ordering of the feature vectors.

Returning to FIG. 3, the operations of blocks 308-322 can be performed as a loop (i.e., iteratively) to produce one centroid from a distinct sub-space of the dataset. In an embodiment, the distinct sub-space of the dataset is a slice of the random view 404 and is referred to as a window, as further described herein.

At block 308, a check is made to determine if there are enough windows remaining in the random view 404. A value that is considered enough depends on the dataset size. A window is a distinct sub-space of the data set and is a slice of the random view 404. The window's size is exactly firstStageCandidateCnt datapoints in some embodiments.

When the check at block 308 determines that there are not enough windows remaining in the random view 404, then at block 310, the random view 404 is reshuffled before the first stage initialization method 300 continues to block 312. When the check at block 308 determines that there are enough windows remaining in the random view 404, then the first stage initialization method 300 continues to block 312.

Block 312 marks the start of operations that are performed in parallel for each thread.

At block 314 each thread determines a window of the random view 404 for the thread.

At block 316, each thread performs one iteration of an isolated k-means++ algorithm to produce one centroid from its window.

At block 318, the centroid resulting from block 316 is added to an output.

Block 320 is the end of the set of operations that are performed in parallel by the threads. Each thread can be given another distinct window before the next iteration is performed. A window is never used twice.

At block 322, a check is made to determine if enough centroids have been added to the output. When the check determines that not enough centroids have been added to the output, the first stage initialization method 300 proceeds to block 308 for the next iteration of the loop. When the check determines that enough (firstStageCentroidCnt in total) centroids have been added to the output, the centroids can be copied from thread-local storages (e.g., one or more temporary storage spaces located in the main memory of the node) to a common storage (e.g., a temporary storage space located in the main memory of the node, accessible by all of the threads). The loop ends and the first stage initialization method 300 proceeds to block 324 to end.

When all computing nodes 102 have finished executing the first stage initialization method 300, local data gathering and distribution can be performed in advance of a second stage initialization method. In an embodiment, this local data gathering and distribution comprises blocks 210 and 212, respectively, of the initialization method 200. A barrier method can be used to determine when all computing nodes 102 have finished the first stage initialization method 300 (i.e., to achieve synchronization among the computing nodes 102). In some embodiments, the barrier method can be performed by the MPI_Barrier method described by the Open Message Passing Interface (MPI) Project. However, those skilled in the art will understand that any method that waits to complete until all group members have entered the barrier may be utilized. To avoid an unnecessary wait, it is beneficial that all computing nodes 102 have a similar amount of feature vectors in their in-RAM databases 118.

At this point, collective data transfer between computing nodes 102 is performed where all computing nodes 102 exchange the centroids produced by their respective first stage initialization methods 300 with all other computing nodes 102, so that every computing node 102 has the combination of all results from all of the computing nodes 102. At the end of this operation, all computing nodes 102 will have the same set of centroids, their number being secondStageInputCnt centroids. In some embodiments, this operation can be performed by the MPI_Allgather method described by the Open MPI Project. However, those skilled in the art will understand that any method that gathers data from all processes and distributes it to all processes may be utilized.

Figure 5:
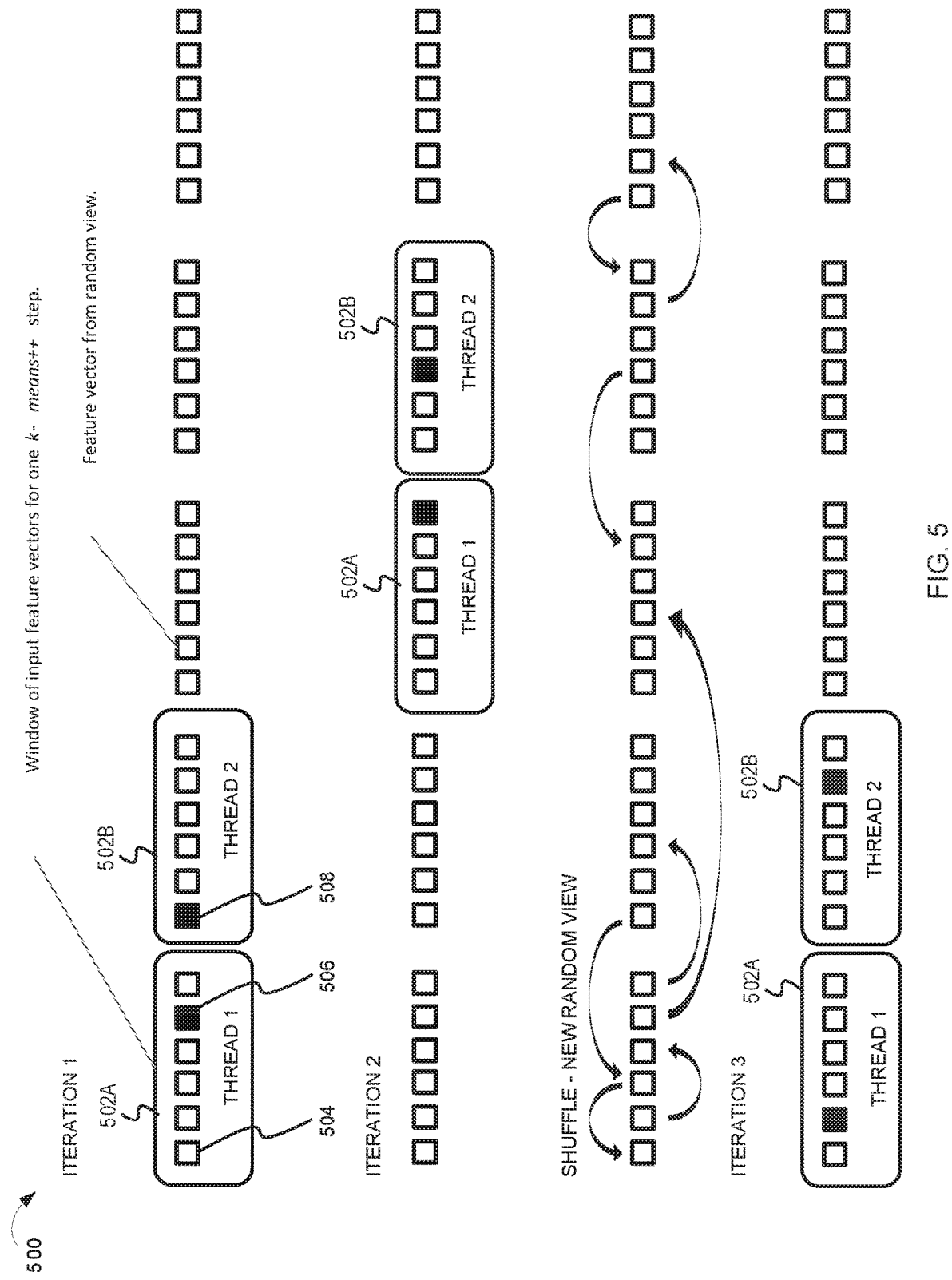
FIG. 5 is a diagram illustrating movement of a "window" within the random view

FIG. 5 is a diagram illustrating movement of two "windows" 502A, 502B within the random view 404 illustrated in FIG. 3 during the first stage initialization method 300. During a first iteration, thread 1 502A and thread 2 502B operate on their respective windows of feature vectors 504. A feature vector can be selected as a centroid in each window (feature vectors 506 and 508 respectively). The selected centroids are indicated as filled in squares.

During a second iteration, the threads move on to new windows of feature vectors, and select new centroids from the windows. Again, the newly selected centroids are indicated as filled squares.

A random shuffle of the feature vectors can be used to create a new random view. The newly created random view may later be sliced into windows as further described herein.

During a third iteration, threads 502A and 502B begin to select centroids from the new windows created after the reshuffling process.

Figure 6:
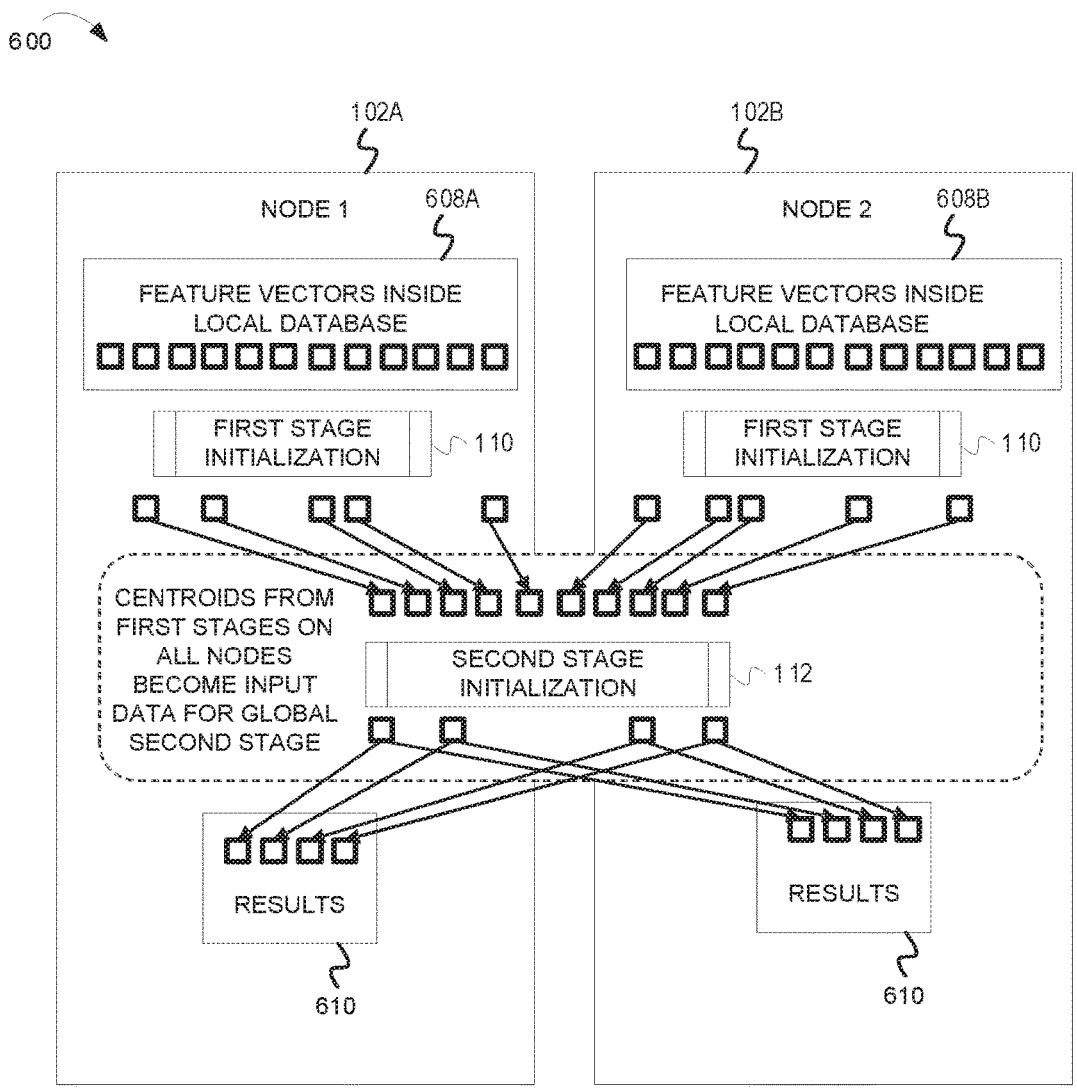
FIG. 6 is a diagram illustrating data flow between first and second initialization stages.

FIG. 6 is a diagram illustrating data flow between the first initialization stage 110 (e.g., first stage initialization method 300) and the second initialization stage 112 (e.g., second stage initialization method 700). In the example illustrated in FIG. 6, two computing nodes 102A and 102B execute the first initialization stage 110 on their respective sets of feature vectors 608A and 608B. The first initialization stage 110 of each computing node 102A, 102B produces a set of centroids from each node's set of feature vectors. The selected centroids from each computing node 102A, 102B are shared with the other computing nodes 102A, 102B. In other words, the selected centroids from computing node 102A are shared with computing node 102B and the selected centroids from computing node 102B are shared with computing node 102A. The complete set of selected centroids becomes input to the second initialization stage 112 that is executed on each computing node to produce results 610, the final set of selected centroids. In an embodiment, result set 610 includes k centroids.

Figure 7:
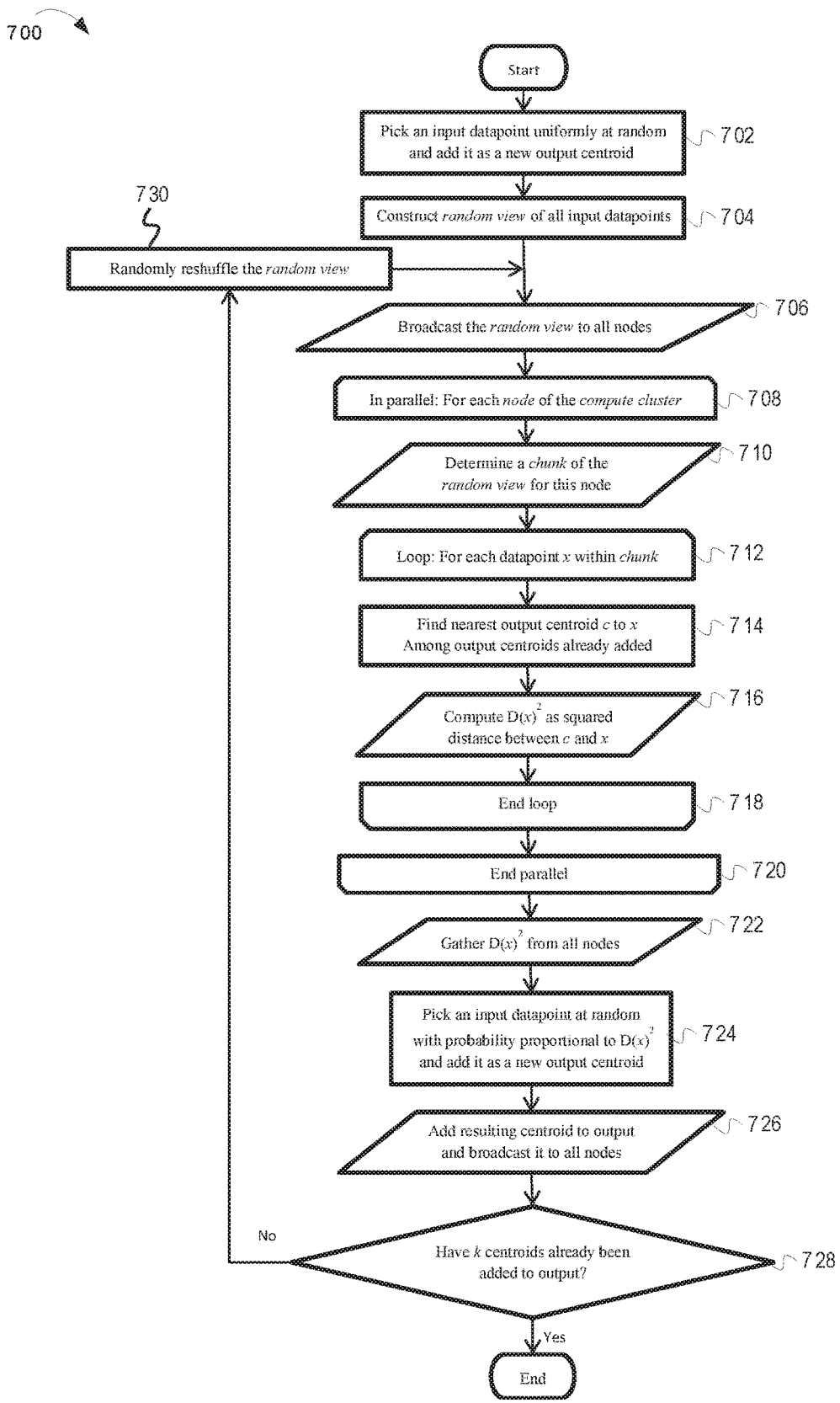
FIG. 7 is a flow chart illustrating further details of a second stage of the multi-node parallel k-means++ initialization.

FIG. 7 is a flow chart illustrating further details of a second stage initialization method 700 of the multi-node parallel k-means++ initialization method 200. In an embodiment, the second stage initialization method 700 comprises block 214 of the initialization method 200. During the first stage initialization method 300, the parallelization was achieved by running multiple instances of the same algorithm on multiple computing nodes 102, and on each computing node, in multiple threads on node-local data. Essentially, there were nodeCnt×number of CPU cores instances of an enhanced k-means++ running in parallel. In contrast, during the second stage initialization method 700, all computing nodes 102 share the same dataset and run one distributed algorithm.

Integrity checks can be performed prior to execution of the second stage initialization method 700. Since the algorithm operates in parallel on multiple computing nodes 102, it is desirable for each computing node to receive the same amount of data to process. This is the underlying reason that it is desirable that the secondStageInputCnt (which is number of centroids passed from the first stage initialization method 300) be an integer multiple of nodeCnt. The combined set of centroids from the first stage initialization method 300 becomes the input dataset for the second stage initialization method 700.

At block 702, one computing node of the plurality of computing nodes 102, referred to as a "master" computing node, picks a centroid at random from the input data. In some embodiments, the master computing node is the computing node of the plurality of computing nodes 102 having the lowest rank. The rank of each of the plurality of computing nodes 102 may be determined by the implementation of the distributed computing framework. The ranks may be implicitly ordered or manually re-ordered. Then the master computing node distributes (i.e., broadcasts) this centroid to all other computing nodes 102 executing the second stage initialization method 700. In some embodiments, the master computing node distributes the centroid to the other computing nodes via the network interconnect 104.

At block 704, a "random view" of the centroid feature vectors that comprise the second stage input dataset from block 702 is created on the master computing node. This is done locally in parallel, using threads for all CPU cores the master computing node has. Such a view presents the feature vectors as if they were randomly shuffled without actually moving them around. This allows the resulting centroid selection in later steps to be uniformly random.

At block 706, the resulting random view is broadcast from the master computing node to all other computing nodes 102 (e.g., via network interconnect 104) so all computing nodes have identical data and random view.

K-means++ requires that for all data points, the nearest centroid and the distance from it are determined. In the first stage initialization method 300, this property is statistically provided by performing the calculation for a "window" of the "random view" of all data points on the computing node performing the first stage initialization method 300. The second stage initialization method 700 performs a similar step, but it must work with the now-global dataset, so it parallelizes this operation so that each computing node performs a portion of the required distance computations.

Block 708 marks the top of a portion of the second stage initialization method 700 that is performed in parallel by each computing node 102 of the compute cluster 100.

At block 710, a chunk of the random view is determined for a computing node. A "window" is created at the beginning of the "random view" from block 704, its size being exactly secondStageCandidateCnt datapoints. The window is then divided into nodeCnt amount of "chunks" of equal size and each computing node processes one of the chunks.

Block 712 is the top of a loop for each datapoint x within the chunk.

At block 714, the computing node finds the nearest output centroid c to x among centroids already added.

At block 716, the computing node calculates $D(x)^2$ as the squared distance between c and x.

Block 718 is the bottom of the loop that iterates over all datapoints x within the chunk.

At block 722, the master computing node then gathers all the processed chunks from all computing nodes 102, thus acquiring the nearest centroid and the distance from it for all datapoints within the window.

At block 724, the master computing node chooses one new data point at random as a new centroid, using a weighted probability distribution where a point x is chosen with probability proportional to $D(x)^2$.

At block 726, the master computing node adds the new centroid to the output and broadcasts (e.g., via network interconnect 104) the new centroid to all of the computing nodes 102.

At block 728, the master computing node checks to determine if k centroids have been added to the output. When k centroids have not yet been added to the output, the second stage initialization method 700 proceeds to block 730, where the master computing node then reshuffles the random view and broadcasts (e.g., via network interconnect 104) this re-shuffled random view to all computing nodes 102.

At this point, all computing nodes 102 share the necessary data to perform another iteration of the loop (e.g., the operations of block 708 through block 726).

When k centroids have been chosen, as determined at block 728, then the second stage initialization method 700 ends.

The second stage initialization method 700 is now over and k centroids have been selected, which was the initial goal. These centroids hold statistical properties comparable to those that would have been initialized by running a conventional k-means++ on the same dataset. However, because the enhanced initialization method 200 (including first stage initialization method 300 and second stage initialization method 700) was used, the centroids can be chosen more rapidly and more efficiently than in conventional k-means++. Each computing node holds an identical copy of this final centroid set.

Note that both the first stage initialization method 300 and the second stage initialization method 700 only use a part of the input space, the randomized "window", whose size is derived from the algorithm's input parameters. This statistical decimation allows the systems and methods disclosed herein to manage even the largest data sets. The staged approach where the first stage initialization method 300 is oblivious to the presence of other computing nodes and the second stage initialization method 700 globally processes data generated by the first stage initialization method 300 from all computing nodes 102 enables production of a centroid set for initializing k-means on the compute cluster 100 including a plurality of computing nodes 102 (e.g., servers, etc.) which each hold distinct parts of the dataset.

Figure 8:
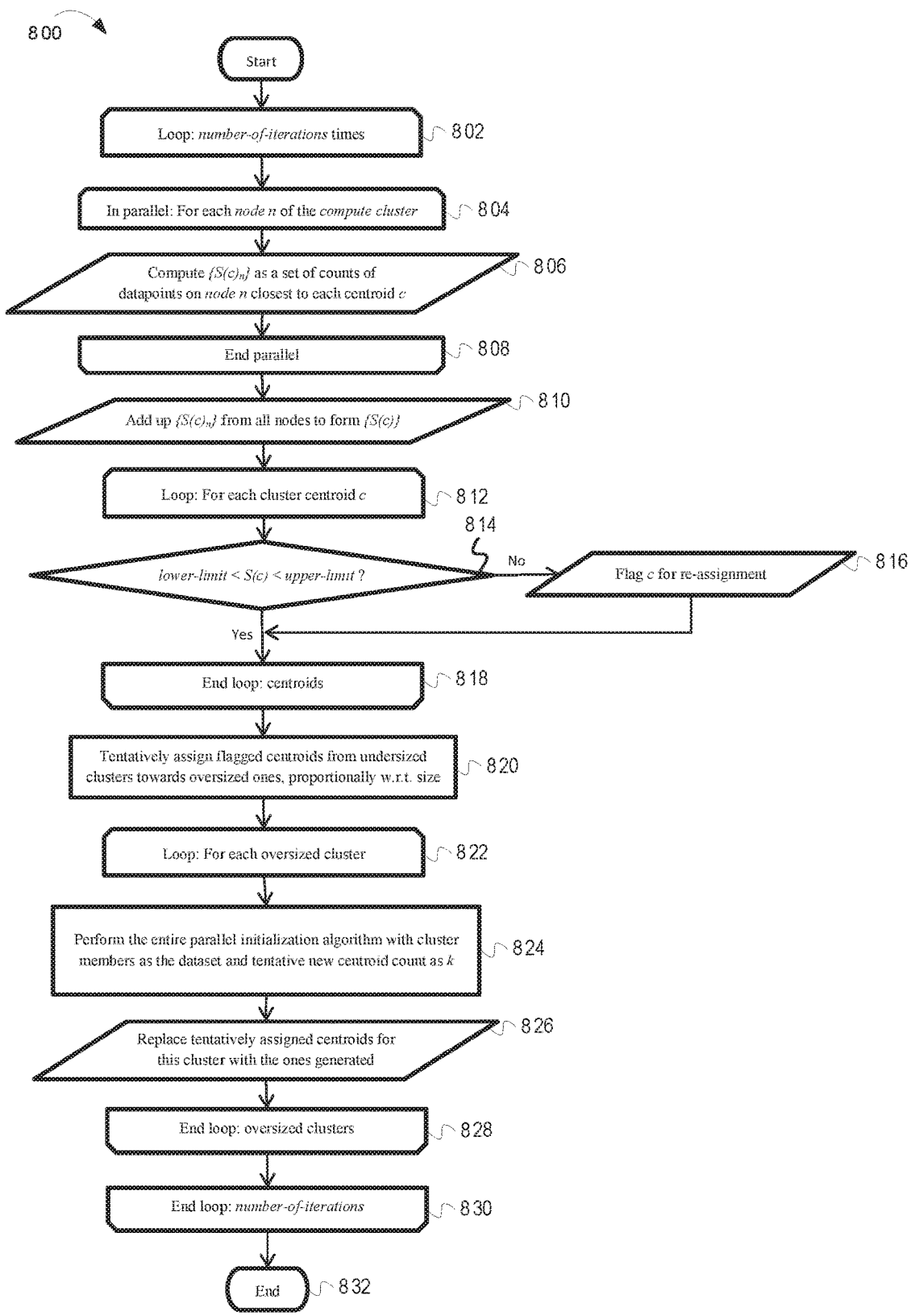
FIG. 8 is a flow chart illustrating a discarding stage of the multi-node parallel k-means++ initialization.

FIG. 8 is a flow chart illustrating a discarding method 800 (i.e., a discarding stage) that may be optionally performed after at least one execution of the initialization method 200, the first stage initialization method 300, and/or the second stage initialization method 700. The discarding method 800 can be used to control cluster sizes. Controlling cluster size can be useful if there are limitations on the cluster sizes that can be used by downstream systems. However, a clustering technique that employs discarding will no longer reflect any naturally occurring clusters of unacceptable size that may be present in the dataset. The tradeoff between the ability to limit cluster size versus the potential that large naturally occurring clusters may end up being removed can be tradeoff that is desirable in an application. However, it may not be universally beneficial to apply, hence the discarding stage can be optional.

In some embodiments, the discarding stage takes 3 parameters:
number-of-iterations (at least one)
lower-limit of cluster size
upper-limit of cluster size Block 802 marks the top of a loop that iterates number-of-iterations times. Blocks 804-828 are within this outer loop.

Block 804 marks the top of a set of operations that are executed in parallel across each computing node 102 of the compute cluster 100.

At block 806, a histogram of sizes of clusters is created (i.e., calculate the number of members of each cluster). Each computing node computes $\{S(c)_n\}$ as a set of counts of datapoints on node n closest to each centroid c.

Block 808 marks the end of parallel operations.

At block 810, a master computing node can add the $\{S(c)_n\}$ from all the computing nodes 102 to form $\{S(c)\}$.

Block 812 is the top of a loop that iterates for each cluster centroid c.

At block 814, a check is made to determine if the size of the cluster having the centroid c is between the upper-limit and lower-limit of the cluster size. When the cluster size is not within the limits, at block 816 the cluster is flagged for reassignment before continuing to block 818. When the cluster size is within the limits, the method 800 continues to block 818.

Block 818 is the bottom of the loop that checks cluster sizes. If cluster centroids remain, control returns to block 812.

At block 820, centroids flagged at block 816 that are undersized are tentatively reassigned from the undersized clusters towards oversized clusters, proportionately with respect to size.

Block 822 is the top of a loop that iterates over each oversized cluster.

At block 824 the first stage initialization method 300 and the second stage initialization method 700 described above are executed, but with their inputs reduced from the entire dataset to only the datapoints which are members of one of the large clusters assigned for splitting (referred to as a working set), and with its parameters set to produce N centroids where N is the number assigned to that cluster at block 816.

At block 826, the N centroids belonging to small clusters with centroids generated at block 816 are replaced with ones generated within the working set.

Block 828 is the end of the loop beginning at block 822 that iterates over oversized clusters.

Block 830 is the end of the loop that starts at block 802 that iterates number-of-iteration times.

As can be seen from the above, clusters outside the given limits have their original centroids dropped. For larger clusters, they are replaced by freshly initialized ones, while smaller clusters are completely discarded. While it may seem like this leaves some datapoints unassigned, that's not the case because for k-means, a property holds that every datapoint belongs to a cluster represented by the closest centroid. Thus, when a centroid is discarded, the datapoints its cluster had are simply "taken over" by their respective next-closest centroid.

A notable edge case exists for the above-described method. Even when splitting a large cluster, it is possible that a significant amount of cluster members have completely identical feature vectors. Such state is highly data-dependent, but it can occur. This may lead to the inability of the proposed parallel initialization algorithm to find the N required centroids at block 824, because they would all be identical. General k-means cannot handle such a state (with multiple identical centroids, it would be ambiguous which is the closest one for its members) and therefore this state has to be avoided. If it were to happen during the regular initialization scenario, it would be treated as an error, suggesting that too many clusters were requested (excessive k, larger than the maximal count of actual clusters in the dataset) and an error would be triggered and the initialization terminated. However, since in this scenario a successfully initialized set of clusters has already been split, raising a hard error may not be a practical option.

In some embodiments, this situation can be addressed by creating as many centroids as possible in the given subspace and dropping only a respective amount of the small cluster centroids meant for reassigning. This way, the algorithm keeps the initialization space of centroids consistent, at the cost of possibly exceeding the upper-limit due to being unable to perform any further split on the given data. This can suggest that upper-limit was set too aggressively for the dataset, and a warning can be issued in some embodiments, but the algorithm can continue normally, just with slightly relaxed requirements.

As stated, the probability of occurrence of this edge-case is highly dependent on the nature of the dataset. In certain embodiments, the dataset consists partially of feature vectors generated from malicious executable files. One of the popular anti-virus detection avoidance techniques used by malware authors is randomization of one or more parts of the malicious program while keeping the overall structure intact. Malware authors often generate large amounts of such files. In combination with the particular features used in certain embodiments, this leads to the existence of large clusters with mostly identical feature vectors and thus addressing this edge-case is important for a successful deployment of the proposed algorithm in these certain embodiments.

Further, the discarding phase algorithm does not guarantee that there will be no clusters outside the specified range. In this case, the algorithm is able to generate a warning and continue with relaxed ranges. However, in practice, even if relaxation occurs, the discarding phase still very significantly reduces the count and scale of oversized clusters. The number of undersized clusters may be hard to control, since k-means can often converge into states where they appear. However, running the discarding phase can significantly reduce their occurrences.

The discarding method 800 described above keeps the number of requested clusters, k, as invariant. To further reduce the number of undersized clusters, a modification can be applied to the algorithm with a parameterized tolerance to the final number of centroids it produces. Loosening the k requirement allows either for adding more centroids to split up oversized clusters, or removing centroids by dropping off undersized centroids, in cases where the opposite extreme is not present to allow for zero-sum reassignment.

FIGS. 9A-9D are block diagrams illustrate a "discarding phase" (e.g., an operation of discarding method 800) in which oversized clusters are split and undersized clusters are discarded.

Figure 9A:
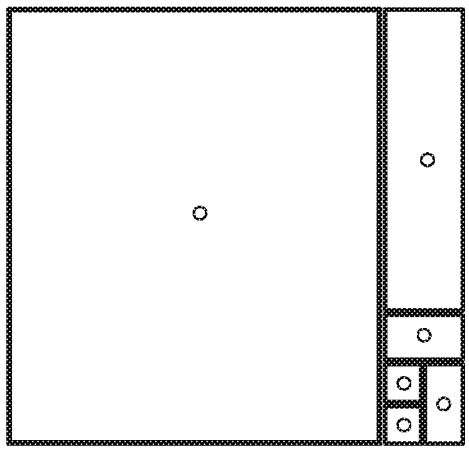
FIGS. 9A-9D are block diagrams illustrating a "discarding phase" in which oversized clusters are split and undersized clusters are discarded.

FIG. 9A illustrates an initial clustering initialization producing clusters of varying sizes.

Figure 9B:
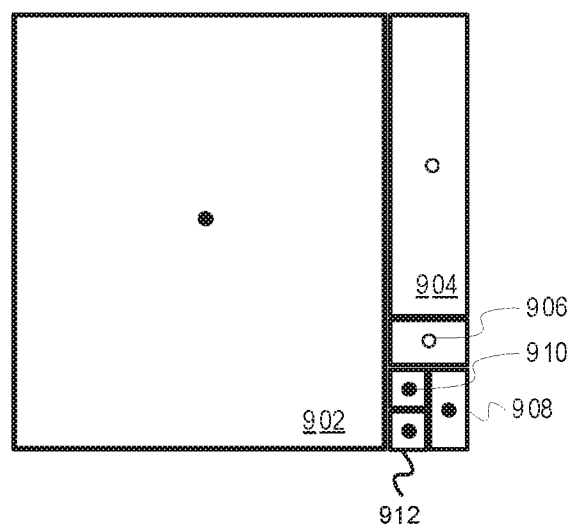

FIG. 9B illustrates identification of an oversized cluster 902 and undersized clusters 908, 910 and 912. Clusters 904 and 906 are within the acceptable limits.

Figure 9C:

FIG. 9C illustrates reinitializing the clustering in the space of the oversized cluster 902. The oversized cluster is split into clusters 902A, 902B, 902C and 902D.

Figure 9D:
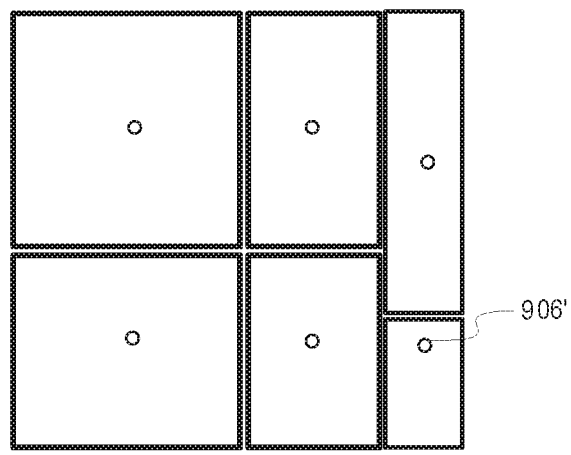

FIG. 9D illustrates discarding undersized clusters 908, 910 and 912. The discarded clusters are reassigned to split the area of the oversized clusters. For example, the centroids of undersized clusters 908, 910, and 912 may be reassigned to cluster 906, producing cluster 906'.

Figure 10:
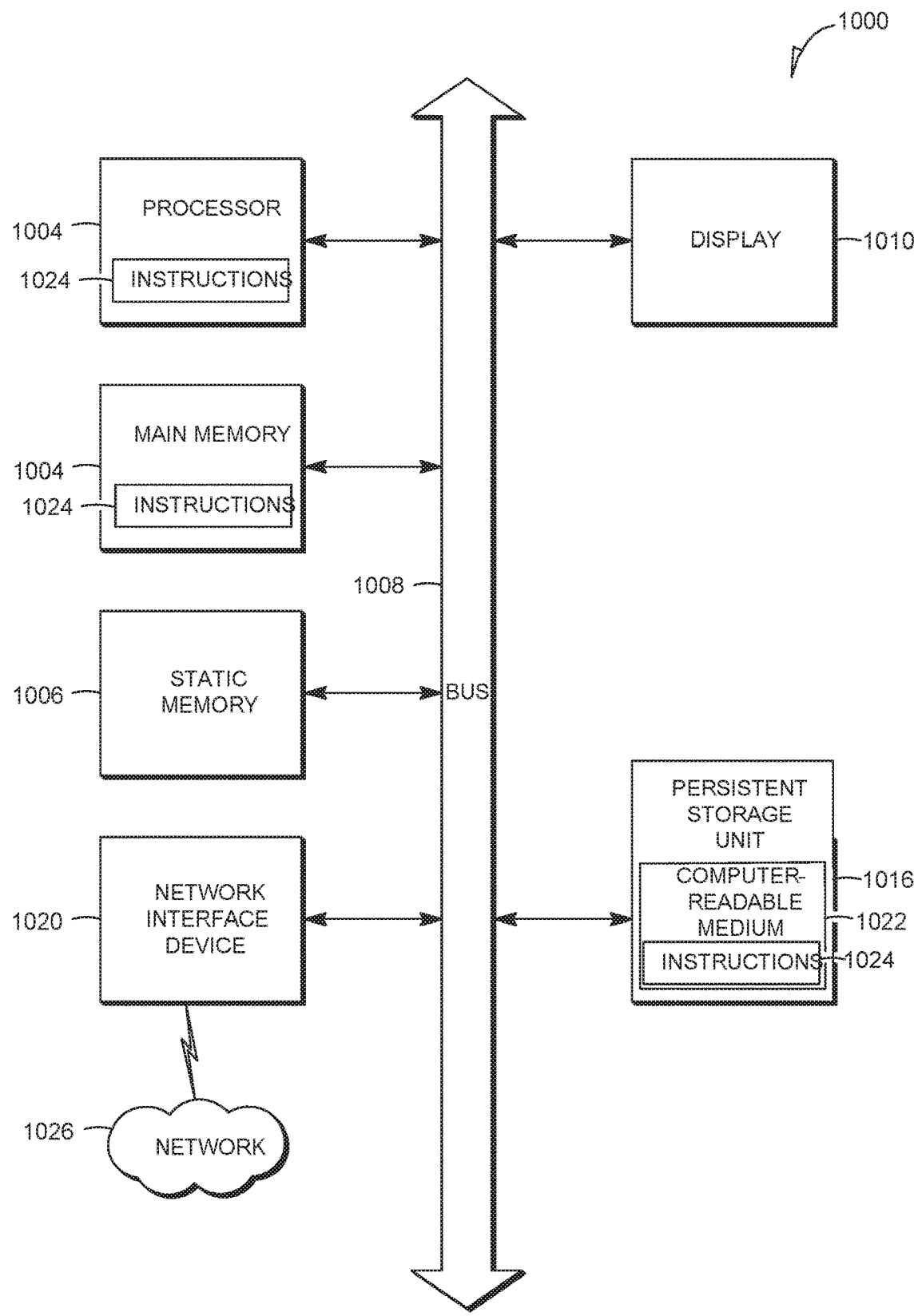
FIG. 10 is a block diagram of an example embodiment of a computer system upon which embodiments of the inventive subject matter can execute.

With reference to FIG. 10, an example embodiment extends to a machine in the example form of a computer system 1000 within which instructions for causing the machine to perform any one or more of the methodologies discussed herein may be executed. For example, computer system 1000 may comprise, in whole or in part, one or more of the computing nodes 102. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 1000 may include at least one processor 1002 (e.g., a central processing unit (CPU), a graphics processing unit (GPU), or both), a main memory 1004 and a static memory 1006, which communicate with each other via a bus 1008. In some embodiments, main memory 1004 may comprise, in whole or in part, main memory 120. Additionally or alternatively, the bus 1008 may comprise, in whole or in part, network interconnect 104 in some embodiments. The computer system 1000 may further include a touchscreen display unit 1010. In example embodiments, the computer system 1000 also includes a network interface device 1020.

The persistent storage unit 1016 includes a machine-readable medium 1022 on which is stored one or more sets of instructions 1024 and data structures (e.g., software instructions) embodying or used by any one or more of the methodologies or functions described herein. The instructions 1024 may also reside, completely or at least partially, within the main memory 1004 or within the processor 1002 during execution thereof by the computer system 1000, the main memory 1004 and the processor 1002 also constituting machine-readable media. In some embodiments, instructions 1024 comprise, in whole or in part, clustering program 108. Additionally or alternatively, the persistent storage unit 1016 may comprise, in whole or in part, storage 106 in some embodiments.

While the machine-readable medium 1022 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. A machine-readable storage medium does not include signals.

The instructions 1024 may further be transmitted or received over a communications network 1026 using a signal transmission medium via the network interface device 1020 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software. In some embodiments, communications network 1026 comprises, in whole or in part, network interconnect 104.

In an aspect, a method for centroid initialization (e.g., initialization method 200) includes a first stage (e.g., first stage initialization method 300) that in turn includes obtaining a set of datapoints and performing one or more integrity checks (e.g., block 302) on the set of datapoints. In some embodiments, the set of datapoints includes a plurality of source files. The method further includes spawning a plurality of threads that create, in parallel, a random view (e.g., block 306) of the set of datapoints and each determine, in parallel, a window of the random view of the set of datapoints for the thread (e.g., block 314). Each window is a distinct sub-space of the set of datapoints. The method also includes each thread of the plurality of threads producing, in parallel, one centroid for the datapoints within the window of the thread by performing one iteration of a clustering algorithm (e.g., block 316). Each produced centroid is stored (e.g., block 318) in a memory storage (e.g., local database 118, main memory 120, etc.) local to each thread.

In some embodiments, the determining of the window of the random view and the producing of the centroid by each thread is iteratively repeated by each thread until a predetermined number of centroids are produced. Each centroid may be an arithmetic mean position of all of the datapoints within one cluster of a plurality of clusters that are generated by the clustering algorithm. In further embodiments, a plurality of computing nodes (e.g., computing nodes 102) each perform, substantially in parallel, a plurality of iterations of the obtaining of the set of datapoints, the performing of the integrity checks, the spawning of the threads, the creating of the random view, the determining of the window, and the producing of the centroid. As a result of each computing node performing iterations of these operations, each computing node produces a plurality of centroids. In some embodiments, the plurality of computing nodes are communicatively coupled via a network interconnect (e.g., network interconnect 104). In further embodiments, the method further includes exchanging (e.g., blocks 210 and 212), via the network interconnect, the centroids produced by each computing node with the other computing nodes of the plurality of computing nodes. This exchange results in each computing node storing all of the centroids produced by the entire plurality of computing nodes. In some embodiments, the centroids comprise a second-stage input dataset.

In further embodiments, the method includes a second stage (e.g., second stage initialization method 700) that in turn includes the plurality of computing nodes performing integrity checks on all of the centroids of the second-stage input dataset. One of the computing nodes comprises a master computing node. The master computing node selects one centroid at random from the second-stage input dataset and broadcasts the selected centroid to the other computing nodes. The threads of the master computing node create, in parallel, a random view of the centroids that comprise the second-stage input dataset and the master computing node broadcasts the random view to the other computing nodes. The master computing node determines a window of the random view. The window comprises a distinct sub-space of the second-stage input dataset. The master computing node divides the window into a plurality of chunks of equal size and each chunk is assigned to one of the computing nodes. The computing nodes determine, in parallel, a centroid from the second-stage input dataset that is nearest to the datapoints within the chunk of the window assigned to the computing node. The master computing node acquires the centroids determined by all the other computing nodes and produces a new centroid for the datapoints within the window of the random view of the second-stage input dataset by performing one iteration of a clustering algorithm.

In some embodiments, the method includes a discarding stage (e.g., discarding method 800). During the discarding, a number of datapoints within each cluster of the plurality of clusters are determined. The method includes identifying oversized and undersized clusters relative to a predetermined lower limit value and a predetermined upper limit value. Centroids from the undersized clusters are proportionally re-assigned to larger clusters and clustering is re-initialized in the oversized clusters in order to split the oversized clusters into clusters of smaller size.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art.

What is claimed is:

1. A method, comprising:
    obtaining a set of datapoints, wherein the set of datapoints includes a plurality of datapoints;
    performing one or more integrity checks on the set of datapoints;
    spawning a plurality of threads;
    creating, in parallel by the plurality of threads, a random view of the set of datapoints;

determining, in parallel by each thread of the plurality of threads, a plurality of windows of the random view of the set of datapoints for the thread, wherein each of the plurality of windows comprises a sub-space of the set of datapoints for the thread distinct from the sub-space of the set of datapoints of the other windows of the plurality of windows; and producing, in parallel by each thread of the plurality of threads, one centroid for the distinct sub-space of the set of datapoints for the thread within each of the plurality of windows of the thread by performing one iteration of a clustering algorithm, wherein each produced centroid is stored in a memory storage local to each thread.

2. The method of claim 1, wherein said determining and said producing are iteratively repeated until a predetermined number of centroids are produced; and wherein each centroid is an arithmetic mean position of all datapoints within a cluster of a plurality of clusters generated by the clustering algorithm.

3. The method of claim 2, wherein a plurality of computing nodes each perform, substantially in parallel, a plurality of iterations of said obtaining, said performing, said spawning, said creating, said determining, and said producing such that each computing node produces a plurality of centroids; and wherein the plurality of computing nodes are communicatively coupled via a network interconnect.

4. The method of claim 3, further comprising:

exchanging, via the network interconnect, the centroids produced by each computing node with the other computing nodes of the plurality of computing nodes such that each computing node stores all of the centroids produced by the plurality of computing nodes, wherein the centroids comprise a second-stage input dataset.

5. The method of claim 4, further comprising:

performing, by the plurality of computing nodes, one or more integrity checks on all of the centroids of the second-stage input dataset;

selecting, by a master computing node of the plurality of computing nodes, one centroid at random from the second-stage input dataset;

broadcasting, by the master computing node, the selected centroid to the other computing nodes of the plurality of computing nodes;

creating, in parallel by the plurality of threads of the master computing node, a random view of the centroids that comprise the second-stage input dataset;

broadcasting, by the master computing node, the random view to the other computing nodes of the plurality of computing nodes;

determining, by the master computing node, a window of the random view of the centroids that comprise the second-stage input dataset, wherein the window comprises a distinct sub-space of the second-stage input dataset;

dividing, by the master computing node, the window into a plurality of chunks of equal size, wherein each chunk is assigned to one of the computing nodes;

determining, in parallel by each computing node, a centroid from the second-stage input dataset that is nearest to the datapoints within the chunk of the window assigned to the computing node;

acquiring, by the master computing node, the centroids determined by all the other computing nodes; and producing, by the master computing node, a new centroid for the datapoints within the window of the random view of the second-stage input dataset by performing one iteration of a clustering algorithm.

6. The method of claim 2, further comprising:

determining a number of datapoints within each cluster of the plurality of clusters;

identifying oversized and undersized clusters relative to a predetermined lower limit value and a predetermined upper limit value;

proportionally re-assigning centroids from the undersized clusters to larger clusters; and re-initializing clustering in the oversized clusters to split the oversized clusters into clusters of smaller size.

7. The method of claim 1, wherein the plurality of datapoints are source files.

8. A system, comprising:

a first storage device, wherein the first storage device is configured to store a plurality of datapoints, wherein the plurality of datapoints comprise a set of datapoints;

a first computing node, comprising:

a network interface configured to communicatively connect the first computing node to a network interconnect;

at least one processor connected to the network interface of the first computing node by a bus;

at least one non-transitory computer-readable storage medium connected to the network interface and the at least one processor of the first computing node by the bus of the first computing node;

wherein the at least one non-transitory computer-readable storage medium of the first computing node stores one or more processor-executable instructions that, when executed by the at least one processor of the first computing node:

obtain the set of datapoints from the first storage device;

perform one or more integrity checks on the set of datapoints;

spawn a plurality of threads within the at least one processor of the first computing node;

create, in parallel by the plurality of threads, a random view of the set of datapoints;

determine, in parallel by each thread of the plurality of threads, a plurality of windows of the random view of the set of datapoints for the thread, wherein each of the plurality of windows comprises a sub-space of the set of datapoints for the thread distinct from the sub-space of the set of datapoint of the other windows of the plurality of windows; and produce, in parallel by each thread of the plurality of threads, one centroid for the distinct sub-space of the set of datapoints for the thread within each of the plurality of windows of the thread by performing one iteration of a clustering algorithm, wherein each produced centroid is stored in a memory storage local to each thread.

9. The system of claim 8, wherein the one or more processor-executable instructions, when executed by the at least one processor of the first computing node, iteratively repeat the determining of the window of the random view and the producing of the centroids for the datapoints within the window until a predetermined number of centroids are produced; and wherein each centroid is an arithmetic mean position of all datapoints within a cluster of a plurality of clusters generated by the clustering algorithm.

10. The system of claim 9, further comprising:

at least a second storage device, wherein the at least second storage device is configured to store a plurality of datapoints, wherein the plurality of datapoints comprise a set of datapoints;

at least a second computing node, comprising:
  a network interface configured to communicatively connect the at least second computing node to the network interconnect;
  at least one processor connected to the network interface of the at least second computing node by a bus;
  at least one non-transitory computer-readable storage medium connected to the network interface and the at least one processor of the at least second computing node by the bus of the at least second computing node;
  wherein the at least one non-transitory computer-readable storage medium of the at least second computing node stores one or more processor-executable instructions that, when executed by the at least one processor of the at least second computing node:
    obtain the set of datapoints from the at least second storage device;
    perform one or more integrity checks on the set of datapoints;
    spawn a plurality of threads within the at least one processor of the at least second computing node;
    create, in parallel by the plurality of threads, a random view of the set of datapoints;
    determine, in parallel by each thread of the plurality of threads, a window of the random view of the set of datapoints for the thread, wherein each window comprises a distinct sub-space of the set of datapoints; and
    produce, in parallel by each thread of the plurality of threads, one centroid for the datapoints within the window of the thread by performing one iteration of a clustering algorithm, wherein each produced centroid is stored in a memory storage local to each thread,
    thereby producing a plurality of centroids by the first computing node and the at least second computing node.

11. The system of claim 10,
wherein the one or more processor-executable instructions, when executed by the at least one processor of the first computing node and the at least one processor of the at least second computing node, exchange, via the network interconnect, the centroids produced by the first computing node and the at least second computing node with each other such that each computing node stores all of the centroids produced by the first computing node and the at least second computing node; and
wherein the centroids comprise a second-stage input dataset.

12. The system of claim 11,
wherein one of the first computing node and the at least second computing node comprises a master computing node; and wherein the one or more processor-executable instructions, when executed by the at least one processor of the first computing node and the at least one processor of the at least second computing node:
  perform, by the at least one processor of the first computing node and the at least one processor of the at least second computing node, one or more integrity checks on all of the centroids of the second-stage input dataset;
  select, by the at least one processor of the master computing node, one centroid at random from the second-stage input dataset;
  broadcast, by the at least one processor of the master computing node, the selected centroid to the at least second computing node;
  create, in parallel by the plurality of threads of the master computing node, a random view of the centroids that comprise the second-stage input dataset;
  broadcast, by the at least one processor of the master computing node, the random view to the other computing nodes of the plurality of computing nodes;
  determine, by the at least one processor of the master computing node, a window of the random view of the centroids that comprise the second-stage input dataset, wherein the window comprises a distinct sub-space of the second-stage input dataset;
  divide, by the at least one processor of the master computing node, the window into a plurality of chunks of equal size, wherein each chunk is assigned to one of the computing nodes;
  determine, in parallel by the at least one processor of the first computing node and the at least one processor of the at least second computing node, a centroid from the second-stage input dataset that is nearest to the datapoints within the chunk of the window assigned to the computing node;
  acquire, by the at least one processor of the master computing node, the centroids determined by all the other computing nodes; and
  produce, by the at least one processor of the master computing node, a new centroid for the datapoints within the window of the random view of the second-stage input dataset by performing one iteration of a clustering algorithm.

13. The system of claim 9, wherein the one or more processor-executable instructions, when executed by the at least one processor of the first computing node:
  determine a number of datapoints within each cluster of the plurality of clusters;
  identify oversized and undersized clusters relative to a predetermined lower limit value and a predetermined upper limit value;
  proportionally re-assign centroids from the undersized clusters to larger clusters; and
  re-initialize clustering in the oversized clusters to split the oversized clusters into clusters of smaller size.

14. The system of claim 8 wherein the plurality of datapoints are source files.

15. A non-transitory computer readable storage medium comprising a set of instructions executable by a computer, the non-transitory computer readable storage medium comprising:
  instructions for obtaining a set of datapoints, wherein the set of datapoints includes a plurality of datapoints;
  instructions for performing one or more integrity checks on the set of datapoints;
  instructions for spawning a plurality of threads;

instructions for creating, in parallel by the plurality of threads, a random view of the set of datapoints;

instructions for determining, in parallel by each thread of the plurality of threads, a plurality of windows of the random view of the set of datapoints for the thread, wherein each of the plurality of windows comprises a sub-space of the set of datapoints for the thread distinct from the sub-space of the set of datapoints of the other windows of the plurality of windows; and instructions for producing, in parallel by each thread of the plurality of threads, one centroid for the distinct sub-space of the set of datapoints for the thread within each of the plurality of windows of the thread by performing one iteration of a clustering algorithm, wherein each produced centroid is stored in a memory storage local to each thread.

16. The non-transitory computer readable storage medium of claim 15, wherein said instructions for determining and said instructions for producing are configured to be iteratively repeated until a predetermined number of centroids are produced; and wherein each centroid is an arithmetic mean position of all datapoints within a cluster of a plurality of clusters generated by the clustering algorithm.

17. The non-transitory computer readable storage medium of claim 16, further comprising instructions for exchanging, via a network interconnect, the centroids produced by the computer with other computers such that each computer stores all of the centroids produced by the plurality of computers, wherein the centroids comprise a second-stage input dataset.

18. The non-transitory computer readable storage medium of claim 17, further comprising:

instructions for performing, by the plurality of computers, one or more integrity checks on all of the centroids of the second-stage input dataset;

instructions for selecting, by a master computer of the plurality of computers, one centroid at random from the second-stage input dataset;

instructions for broadcasting, by the master computer, the selected centroid to the other computers;

instructions for creating, in parallel by the plurality of threads of the master computer, a random view of the centroids that comprise the second-stage input dataset;

instructions for broadcasting, by the master computer, the random view to the other computers;

instructions for determining, by the master computer, a window of the random view of the centroids that comprise the second-stage input dataset, wherein the window comprises a distinct sub-space of the second-stage input dataset;

instructions for dividing, by the master computer, the window into a plurality of chunks of equal size, wherein each chunk is assigned to one of the computers;

instructions for determining, in parallel by each computer, a centroid from the second-stage input dataset that is nearest to the datapoints within the chunk of the window assigned to the computer;

instructions for acquiring, by the master computer, the centroids determined by all the other computers; and instructions for producing, by the master computer, a new centroid for the datapoints within the window of the random view of the second-stage input dataset by performing one iteration of a clustering algorithm.

19. The non-transitory computer readable storage medium of claim 15, further comprising:

instructions for determining a number of datapoints within each cluster of the plurality of clusters;

instructions for identifying oversized and undersized clusters relative to a predetermined lower limit value and a predetermined upper limit value;

instructions for proportionally re-assigning centroids from the undersized clusters to larger clusters; and instructions for re-initializing clustering in the oversized clusters to split the oversized clusters into clusters of smaller size.

20. The non-transitory computer readable storage medium of claim 15 wherein the plurality of datapoints are source files.

* * * * *